United States Patent [19]
Warner

[11] Patent Number: 5,293,992
[45] Date of Patent: Mar. 15, 1994

[54] UNITARY HOLDER FOR TWO CD BOXES WHICH CAN BE COMBINED WITH ONE OR MORE IDENTICAL HOLDERS FOR STORING A PLURALITY OF CD BOXES

[76] Inventor: Chad H. Warner, 366 S. Elizabeth St., Salt Lake City, Utah 84102

[21] Appl. No.: 986,496

[22] Filed: Dec. 7, 1992

[51] Int. Cl.$^5$ .............................................. B65D 85/57
[52] U.S. Cl. ................................. 206/309; 206/312; 206/444; 211/40; 211/55; 312/9.58
[58] Field of Search ........................... 206/309-313, 206/444; 211/55, 40; 312/9.43, 9.58, 901

[56] References Cited

U.S. PATENT DOCUMENTS

| | | | |
|---|---|---|---|
| 4,765,469 | 8/1988 | Seifert | 206/309 |
| 4,817,792 | 4/1989 | Seifert | 206/309 |
| 5,180,058 | 1/1993 | Hu | 206/309 |

FOREIGN PATENT DOCUMENTS

| | | | |
|---|---|---|---|
| 1155732 | 5/1958 | France | 206/312 |
| 0162279 | 7/1991 | Japan | 206/309 |
| 0162280 | 7/1991 | Japan | 206/309 |

Primary Examiner—Bryon P. Gehman
Attorney, Agent, or Firm—Terry M. Crellin

[57] ABSTRACT

A unitary holder device holds two protective CD boxes. The holder device comprises a pair of side rails positioned along opposite sides of the holder device such that a first CD box can be received and held between the side rails. A pair of lips or tabs project upwardly from opposite ends of the holder device such that a second CD box is received and held between the pair of lips or tabs. The second CD box is held in superimposed position next to the first CD box. Two or more holder devices can be combined to store a plurality of CD boxes, with the CD boxes being positioned in a stack one upon the other. The hinges of the CD boxes are all located on one side of the stack, and the hinges on each CD box is in alignment with pivotable engagement members that hold the adjacent holder devices together. Adjacent holder devices in the stack can be pivoted to open a CD box that is held between the adjacent holder devices.

7 Claims, 2 Drawing Sheets

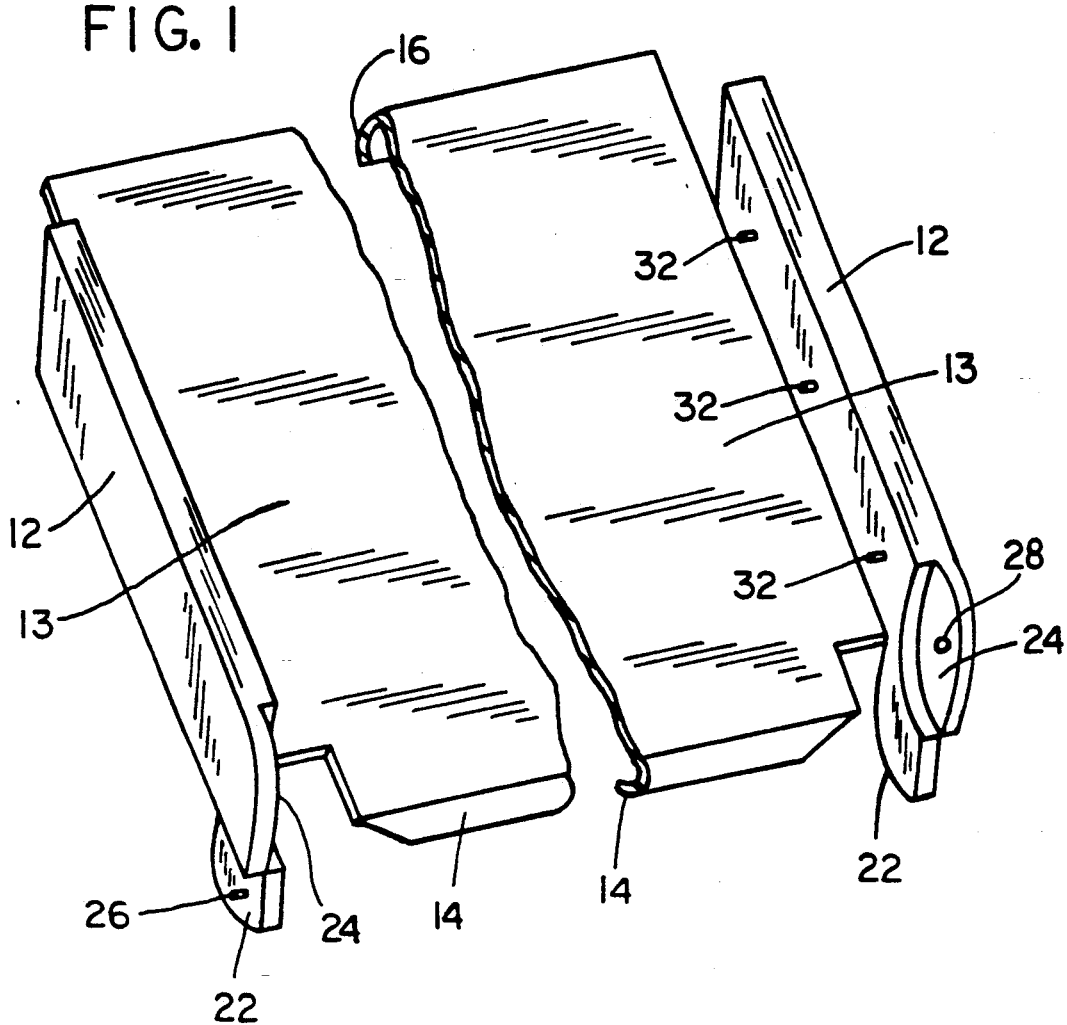
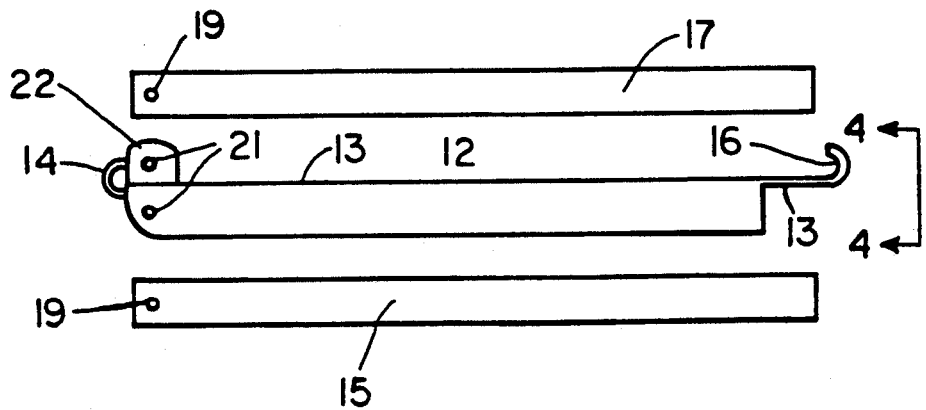

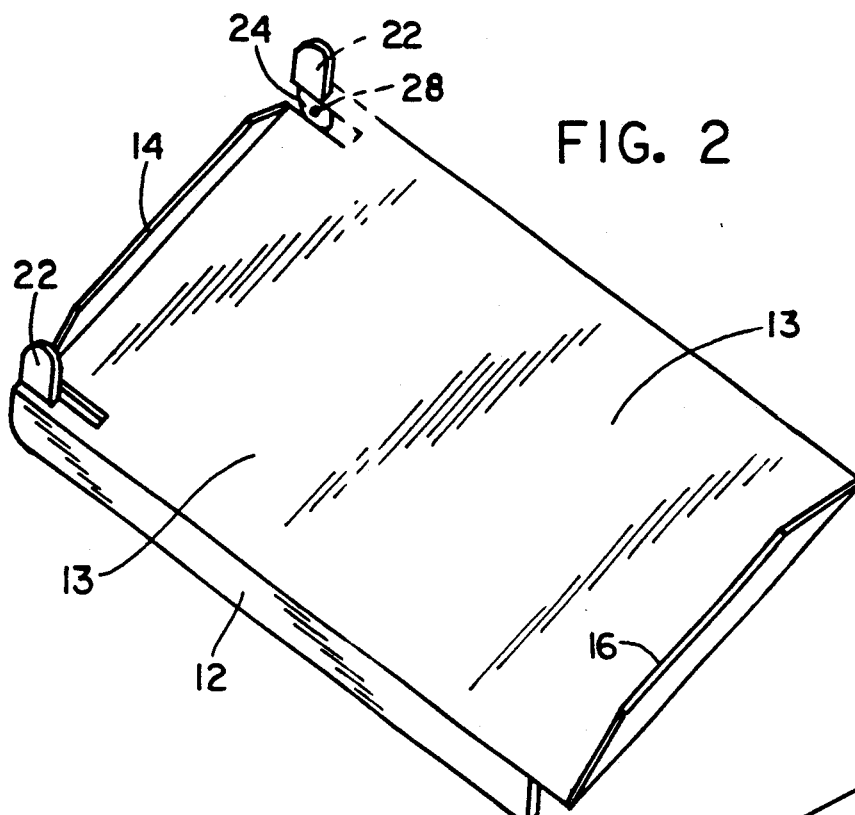
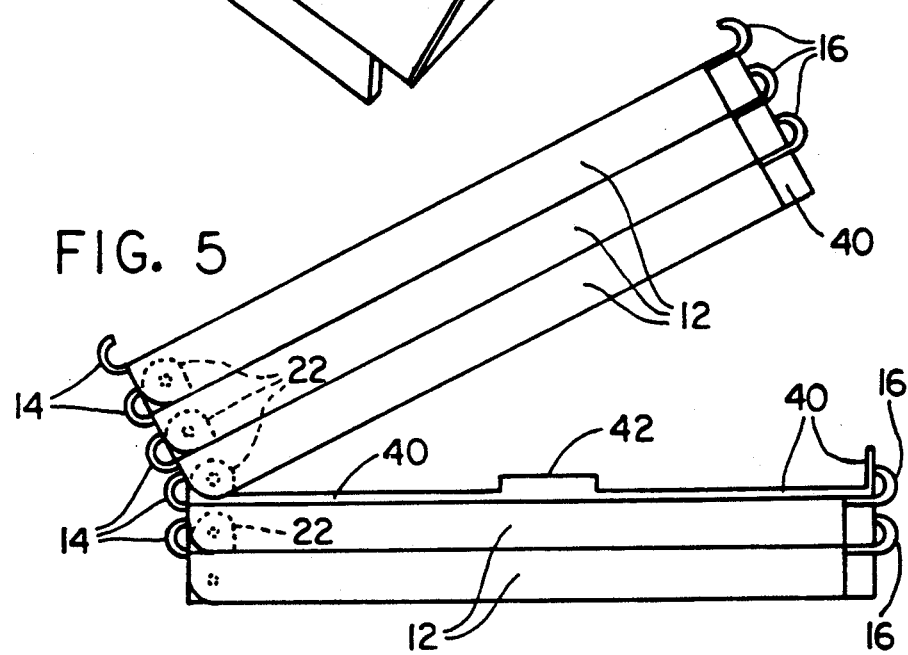
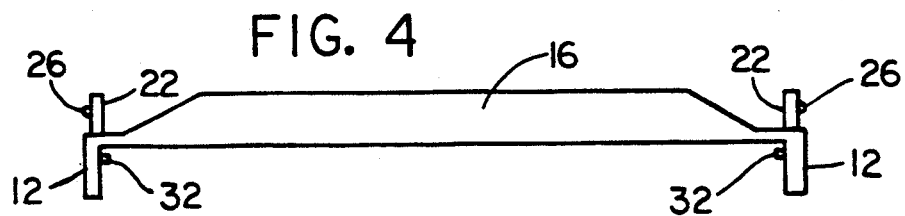

UNITARY HOLDER FOR TWO CD BOXES WHICH CAN BE COMBINED WITH ONE OR MORE IDENTICAL HOLDERS FOR STORING A PLURALITY OF CD BOXES

BACKGROUND OF THE INVENTION

1. Field of the Invention

The present invention relates to a unitary holder for holding two CD Boxes (sometimes called jewel boxes, but the term CD Box will be used throughout this disclosure). The present invention in particular relates to individual, identical holders that can be snapped together or otherwise combined to store a plurality of CD boxes.

2. State of the Art

The sales of compact discs has been increasing by very large amounts. Compact discs have completely displaced long play records and have sales which are equivalent or greater than pre-recorded audio cassette tapes. Almost universally, the compact discs are sold in a plastic CD box. These boxes are almost identical, having a flat top, with short side walls extending downwardly from opposite sides of the flat top. These boxes further have a flat bottom, with a short side wall extending upwardly from opposite ends of the flat bottom. The flat top is pivotally attached at one of its ends to the corresponding end of the flat bottom. When the flat top is pivoted so as to be parallel with the flat bottom, a relatively thin box is formed which comprises the flat top and flat bottom spaced apart by a distance equal to the distance that the short side walls extend from the respective flat top and bottom. The short side walls form a continuous enclosed perimeter around the CD box. A hub is associated with the flat bottom and is capable of having compact disc retained on the hub and within the CD box when the flat top is moved to its closed position in which it is essentially parallel to the flat bottom.

Almost immediately from their inception, carrier trays have been used to hold a plurality of CD boxes for tidy storage of the boxes. The storage trays are rather cumbersome and individual CD boxes must be removed from the plurality of boxes stored on the tray when a compact disc is to be used. After the compact disc has been used, it is replaced in the CD box, and the box must be repositioned on the storage tray. Such trays are almost impossible to use for storage of compact discs for use in a motor vehicle, or other storage wherein a relatively few favorite compact discs are to be transported from one place to another.

In U.S. Pat. Nos. 4,790,926 and 4,741,438 there are disclosed rigid rectangular storage boxes that have compartments for receiving either a single CD box or a dual CD box. The storage boxes of these two patents are of a defined size that holds a predetermined number of CD boxes. The CD boxes slip into and out of the compartments in the storage boxes, and a CD box must be removed from the storage box to gain access to the compact disc in the CD box. Although a limited number of favorite compact discs can be transported by the storage boxes of these two patents, it is inconvenient to gain access to any one of the compact discs, especially when the compact disc is to be used in a CD player in an automotive vehicle.

In U.S. Pat. No. 4,817,792 there is disclosed a container shown in which each individual container is subdivided into a front wall portion and a rear wall portion which are interconnected by links in such a manner that opening and closing actions of the front and rear wall portions are similar to the movement of a parallelogram guide for each individual container. Each individual container is further detachably connected to an additional container, whereby a multiple filing box is obtained that can be opened and closed in concertina-like manner. Each wall portion of each individual container is adapted to hold a CD box therein in sliding engagement. Although the individual containers can be combined so as to accommodate a few favorite CD discs for portable transport such as inside an automobile, boat or other motor vehicle, the resulting block of CD boxes is rather cumbersome and it is a relatively tedious operation to remove an actual CD disc from the block. The block must be opened like a concertina so as to make a long block. The desired CD box must then be grasped and removed from the block before the CD disc can be recovered from the selected CD box. The CD box must then be returned to the block. Replacing a CD disc after use is just as tedious, comprising in essence the reverse of the above steps.

3. Objectives

A principal objective of the invention is to provide a novel, unitary holder that is capable of holding two CD boxes, wherein the holder is made of a single, unitary member that is relatively inexpensive to manufacture and can be used with an additional, identical holder to store an additional CD box for each additional holder, with each additional holder being pivotally connected to an adjacent holder through a pivot axis that is substantially coincident with the pivot axis of the cover of the CD box that is being carried by the adjacent holder, and with each additional holder further being able to engage the top cover of the CD box in the adjacent holder whereby when the additional holder, containing the additional CD box is pivoted to close the CD box of the adjacent holder, the CD boxes are stored in a neat rectangular block, with the CD boxes being held superimposed directly over each other, and when the additional holder is pivoted to open the CD box of the adjacent holder, the CD disc of that CD box is readily accessible to be removed from the block.

BRIEF DESCRIPTION OF THE INVENTION

The above objective is achieved in accordance with the present invention by providing a novel, unique unitary holder device that is capable of holding two CD boxes in which CD discs are stored. One CD box is held so as to be exposed from one side of the holder device, and the other CD box is held so as to be exposed from the other side of the holder device. The holder device can be combined with one or more identical device to store a plurality of such CD boxes, with the CD boxes being superimposed one over another in a stack or block. The CD boxes are positioned such that the hinges of the covers of the CD boxes are all located on one side of the stack or block. Further, the hinges on each of the CD boxes are in axial alignment with pivotal engagement means on the respective holder devices that retain adjacent holder devices together in their operative position.

The initial holder device holds two CD discs, and each holder device that is added to the group accommodates one additional CD box. In attaching an additional holder device to the block or stack, the pivotal engagement means of the added device and the abutting device of the stack or block are interconnected. In addition, the additional holder device engages the exposed side of the CD box of the abutting holder. An additional CD box is inserted on the otherwise exposed face of the additional holder device. Thus, for each additional holder device that is added to the group, an additional CD box can be added to the block or stack, and the process of adding additional holder devices can be continued as desired.

All the titles of the CD boxes at the two opposite ends thereof are in full view at opposite side ends of the block of CD boxes held in the holder devices. To retrieve a CD disc from any one of the CD boxes, the block is split, by pivoting the pivotal connection of adjacent holder devices that aligns with the pivot axis of the top cover of that selected CD disc. As the block is pivoted open, the top cover of the selected CD disc pivots with one portion of the split block, and the bottom tray of the selected CD box pivots with the other portion of the split block. The CD disc is fully exposed without removing the CD box from the block. Upon removal of the CD disc from the selected CD box, the block can be pivoted back together. Then when the CD disc is to be returned to its CD box, the above procedure is simply repeated.

Additional objects and features of the invention will become apparent from the following detailed description, taken together with the accompanying drawings.

THE DRAWINGS

A preferred embodiment of the present invention representing the best mode presently contemplated of carrying out the invention is illustrated in the accompanying drawings in which:

FIG. 1 is a pictorial representation of one preferred embodiment of the unitary, single piece holder device of the present invention, with the holder device being shown in upside down position to show details of the pivotal engagement means;

FIG. 2 is a pictorial representation similar to that of FIG. 1 but showing the unitary, single piece holder device of the present invention in its upright position;

FIG. 3 is side elevation of the holder device of FIGS. 1 and 2, with the holder device of FIG. 3 being shown in its upright position corresponding to FIG. 2 and with two CD boxes that can be held by the holder device shown in exploded positions;

FIG. 4 is an end elevation of the holder device of FIGS. 1-3 taken along line 4—4 of FIG. 3; and FIG. 5 is a side elevation of a block of CD boxes being held together by the holder devices of the present invention, with the block being pivoted open at one of the CD boxes to expose the tray of that CD box that retains the CD disc in that CD box.

DETAILED DESCRIPTION OF THE ILLUSTRATED EMBODIMENTS

Referring to the drawings, there is illustrated one preferred embodiment of a unitary holder device for holding two CD boxes in accordance with the present invention. Two or more of the holder devices can be combined, as shown in FIG. 5, with one another so as to store a plurality of such CD boxes in the position of a stack or block, wherein the CD boxes are superimposed one upon the other such that the hinges of the CD boxes are all located on one side of the stack, and with the hinges on each respective CD box being in alignment with pivotable engagement means on the respective holder devices that hold the stack or block together.

Any individual box in the stack or block as shown in FIG. 5 can be pivoted open to gain access to the compact disc therein without removing that box from the stack or block of boxes and without opening any other boxes or removing any of the other boxes from the stack or block of boxes.

Generally, the holder device comprises a pair of side rails 12 that are substantially parallel with each other. Means are provided for spacing the side rails 12 apart from each other such that a first CD box can be received and held between the side rails 12, with the hinged end of the first CD box lying adjacent to a straight line between respective one ends of the pair of side rails 12. The means for spacing the side rails 12 apart advantageously comprises a rigid, flat, essentially planar member or sheet 13 that extends between the side rails 12 and interconnects the upper side edges of the side rails 12. The flat member or sheet 13 lies between first and second CD boxes 15 and 17 (shown in FIG. 3 in exploded positions) that are held by the device.

Preferably, the side rails 12 and the flat sheet 13 are formed of the same rigid plastic material and are formed by extrusion molding the holder device from that rigid plastic material. To save plastic material, cut outs, although not shown in the drawings can be provided in the center of the sheet 13. The central cut out could be sized so as to approach within an inch or so of the opposite sides and ends of the sheet 13.

A first lip or tab 14 projects upwardly from one end of the holder device (the holder device of FIG. 1 is shown in inverted configuration, actually showing the bottom side of the device). The lip or tab 14 is formed between the one ends of the pair of side rails 12 such that the lip or tab 14 extends away from a hinged end of a first CD box 15 (FIG. 3) when such a first CD box is received between the pair of rails 12. A second lip or tab 16 projects upwardly from a second end of the holder device opposite the first end such that the second lip or tab 16 extends away from an opposite end of a first CD box when such a first CD box is received between the pair of rails 12.

The first and second lips or tabs 14 and 16 are spaced from each other such that a second CD box 17 (FIG. 3) can be received and held between the first and second lips or tabs 14 and 16, with a hinged end of the second CD box 17 lying above and next to the hinged end of the first CD Box 15. Preferably, the first lip or tab 14 slopes toward the second lip or tab 16, and the second lip or tab 16 slopes toward the first lip or tab 14 so that the first and second lips or tabs make firm, frictional engagement with opposite end sides of a CD box received therebetween.

Engagement means are formed at the one ends of the side rails for pivotally attaching corresponding one ends of a second holder device to the first holder device such that the first holder device can pivot about the one ends of the second holder device. In the preferred embodiment as illustrated, the engagement means at the one ends of the side rails 12 comprises projections 22 extending from each of the one ends of the side rails 12, with the projections 22 extending in the same direction from the side rails 12 and substantially perpendicular from the one ends of the side rails 12. Interengaging snap catches are associated with the projections 22 and the one ends of the side rails, with the catches on the projections 22 of the first holder interengaging corresponding catches on the side rails 12 of the second holder.

As illustrated, the projections 22 are formed integrally with the end of the side rails 12. The projections 22 are preferably formed during molding of the holder device. An indentation 24 is preferably formed opposite each projection 22 on the side rails 12. The indentations 24 allow the projections 22 of an adjacent holder device to fit or mesh therein. As best shown in FIG. 1, the interengaging snap catches are formed from nibs or nubs 26 and depressions or dimples 28 formed in the respective projections 22 and indentations 24. As illustrated,, the nubs 26 are formed on the side of the projections 22 and extend outwardly substantially perpendicular from the projections. The dimples 28 are formed into the sides of the indentations 24, such that when the projections 22 are received in the indentations 24, the nubs 26 snap into the dimples 28 so that the two adjacent holders are held securely together but can pivot about an axis through the nubs 26 and dimples 28. The axes through the nubs 26 and dimples 28 are in axial alignment with the hinge axes of the respective CD boxes held by the holder device. Two CD boxes 15 and 17 are shown in exploded position in FIG. 3. When these boxes are moved toward each other and into engagement with the holder device, the hinge axes 19 of the CD boxes 15 and 17 are in alignment with the axes 21 of the interengaging snap catches of the holder device.

As shown in FIG. 5, five holder devices of the present invention are shown connected together in a block or stack that is capable of holding six CD boxes. As illustrated in FIG. 5, the block or stack is pivoted open between the second and third holder device. The side rails 12 of the third holder device pivots the top lid of the CD box 40 upwardly, and the tabs 14 and 16 on the second holder device hold the bottom tray of the CD box 40 with the second holder as the third holder pivots with respect to the second holder. This exposes the retainer hub 42 of the CD box so that a CD disc can be removed from or slipped on the retainer hub 42.

The holder device of the present invention can be provided with engagement lugs 32 that extend inwardly from an inner side of the side rails 12 such that the lugs 32 make firm, frictional engagement with the opposite sides of a CD box to hold the CD box securely between the side rails 12. Most CD boxes are provided with slots spaced apart along the upper portions of the side walls of the CD box. It is advantageous that the engagement lugs 32 extending inwardly from an inner side of the side rails 12 can engage these slotted openings in the opposite sides of the CD box to retain the CD box securely between the side rails 12.

Although preferred embodiments of the holder device of the present invention have been illustrated and described, it is to be understood that the present disclosure is made by way of example and that various other embodiments are possible without departing from the subject matter coming within the scope of the following claims, which subject matter is regarded as the invention.

I claim:

1. A unitary holder device for holding two protective CD boxes in which compact discs are stored, wherein said device can be combined with one or more of the same devices to store a plurality of such protective CD boxes, with the CD boxes being positioned in a stack one upon the other such that hinges of the CD boxes are all located on one side of said stack and with the hinge on each respective CD box being in alignment with pivotable engagement means on the respective holder devices that hold the devices together in their operative position, and further wherein any individual box in the stack thereof can be pivoted open to gain access to a compact disc therein without removing that box from the stack of boxes and without opening any other boxes or removing any of the other boxes from the stack of boxes, said holder device comprising a pair of side rails that are substantially parallel with each other;
means for spacing the side rails apart from each other such that a first CD box can be received and held between said side rails with the hinged end of said first CD box lying adjacent to a straight line between respective one ends of said pair of side rails;
a first lip or tab that projects upwardly from one end of said device, said first lip or tab being formed between said one ends of said pair of side rails such that the first lip or tab extends away from a hinged end of a first CD box when said first CD box is received between said pair of side rails;
a second lip or tab that projects upwardly from a second end of said device opposite said one end such that said second lip or tab extends away from an opposite end of a first CD box when said first CD box is received between said pair of side rails;
said first and second lips or tabs being spaced such that a second CD box can be received and held between said first and second lips or tabs, with a hinged end of said second CD box lying above and next to the hinged end of a first CD box when said first CD box is received between said pair of side rails; and
engagement means at the one ends of said pair of side rails for pivotally attaching a second holder device to said first holder device such that said first holder device can pivot about said second holder device.

2. A holder device as in claim 1 wherein engagement lugs extend inwardly from an inner side of said pair of side rails such that said lugs make firm, frictional engagement with opposite sides of a first CD box when said first CD box is received between said pair of side rails.

3. A holder device as in claim 1 wherein engagement lugs extend inwardly from an inner side of said pair of side rails such that said lugs can engage slotted openings in opposite sides of a first CD box when said first CD box is received between said pair of side rails to hold said first CD box securely between said pair of side rails.

4. A holder device as in claim 1 wherein said first lip or tab slopes toward said second lip or tab and said second lip or tab slopes toward said first lip or tab so that the first and second lips or tabs make firm, frictional engagement with opposite end sides of a second CD box when said second CD box is received between said first and second lips or tabs.

5. A holder device as in claim 1 wherein the means for spacing the side rails apart comprises a flat, rigid, substantially planar member that interconnects the upper side edges of said side rails and lies between first and second CD boxes when said first CD box is received between said pair of rails and said second CD box is received between said first and second lips or tabs.

6. A holder device as in claim 1 wherein said engagement means at the one ends of said side rails comprises projections extending from each of said one ends of said side rails, with the projections extending in the same direction from said side rails and substantially perpendicular from said one ends of said side rails; and interengaging snap catches on said projections and said one ends of said side rails, with the catches on said projections of said first holder interengaging corresponding catches on said side rails of said second holder, wherein said first and second holder can pivot with respect to each other about the interengaging snap catches.

7. A holder as in claim 6 wherein said interengaging snap catches comprise nibs formed on one of said projections or one ends of said side rails of said first holder;

and depressions formed on the other corresponding projections or one ends of said side rails of said second holder that receives said nibs therein for snap engagement and pivotal movement about said snap catches.

* * * * *